United States Patent [19]
Dobler et al.

[11] Patent Number: 6,042,252
[45] Date of Patent: Mar. 28, 2000

[54] MOUNTING DEVICE OF AN ILLUMINATION ARRANGEMENT OF A VEHICLE

[75] Inventors: Karl-Otto Dobler; Guenter Steinert, both of Reutlingen, Germany

[73] Assignee: Robert Bosch GmbH, Stuttgart, Germany

[21] Appl. No.: 09/109,781

[22] Filed: Jul. 2, 1998

[30] Foreign Application Priority Data

Jul. 30, 1997 [DE] Germany .......................... 197 32 745

[51] Int. Cl.⁷ ....................................................... B60Q 1/04
[52] U.S. Cl. ..................... 362/365; 362/269; 362/275; 362/287; 362/288
[58] Field of Search ........................... 248/289.11, 291.1, 248/299.1; 362/549, 269, 287, 275, 288, 364, 365, 372, 419, 427; 292/3–6, 10, 11, 13, 32, 44, 61, 63, 71

[56] References Cited

U.S. PATENT DOCUMENTS 5,289,358  2/1994  Halemeier ................................ 362/365

FOREIGN PATENT DOCUMENTS 2 209 541  9/1973  Germany .

*Primary Examiner*—Cassandra Spyrou
*Assistant Examiner*—Craig Curtis
*Attorney, Agent, or Firm*—Michael J. Striker

[57] ABSTRACT

A mounting device for mounting an illumination arrangement on a vehicle in several mounting points so that the illumination device in the region of one of the mounting points is turnable about an axis between a turned-in position and a turned-out position, the mounting device has a receiving part arrangeable on a vehicle and having at least one concavely curved shell-shaped region extending in planes perpendicular to the turning axis, at least one portion providable on the illumination arrangement and convexly curved in planes extending perpendicular to the turning axis, the at least one portion in the turned-out position being insertable in or withdrawable from the at least one shell region in a mounting direction and opposite to the mounting direction correspondingly, the at least one portion being arranged in at least one shell region so as to be slidingly displaceable so that during a sliding displacement a turning around the turning axis is performed.

16 Claims, 4 Drawing Sheets

MOUNTING DEVICE OF AN ILLUMINATION ARRANGEMENT OF A VEHICLE

BACKGROUND OF THE INVENTION

The present invention relates to a mounting device for an illumination arrangement of a vehicle.

One of such mounting devices is disclosed for example in the German patent document DE 22 09 541 A1. In this mounting device, the illumination arrangement formed as a headlight-light unit is mountable on the vehicle by several releasable mounting parts. A hinge is provided in the region of one mounting point, so that the illumination arrangement is turnable in and out on the receptacle about a vertically extending axis when a further mounting part which is spaced from the hinge is released. The hinge is formed as an additional separate part connected with the illumination arrangement and the vehicle, for example via screws. A turning of the illumination arrangement is provided to make accessible its rear side for exchange of the light sources. However, for mounting and dismounting of the illumination arrangement it is necessary, in addition to the release of the other mounting points, also to release the hinge on the receptacle of the vehicle or the illumination arrangement, so that the dismounting and mounting is correspondingly complicated and expensive.

SUMMARY OF THE INVENTION

Accordingly, it is an object of present invention to provide a mounting device for an illumination arrangement of a vehicle, which avoids the disadvantages of the prior art.

In keeping with these objects and with others which will become apparent hereinafter, one feature of present invention resides, briefly stated, in a mounting device which has a receiving part arranged on the vehicle and provided with at least one concavely curved shell-shaped region in planes extending perpendicular to a turning axis, the illumination arrangement has at least one portion which is convexly curved in planes extending perpendicular to the turning axis, the at least one portion of the illumination arrangement in a turned out position is insertable in and withdrawable from the at least one shell region of the receiving part in or opposite to a mounting direction, and the at least one portion of the illumination arrangement is arranged in at least one shell region of the receiving part slidingly displaceably so that during a sliding displacement a turning around the turning axis is performed.

When the mounting device is designed in accordance with the present invention, it has the advantage that the turnability of the illumination arrangement s performed without an additional hinge and moreover, the mounting and dismounting of the illumination arrangement is performed in a simple manner in the turned-out position of the illumination arrangement.

In accordance with another feature of present invention, at least one locking device is provided, so as to secure the illumination arrangement and its turned-in position from withdrawal opposite to the mounting direction. Therefore a safety fixing of the illumination arrangement on the receiving part in its turned-in position is provided.

In accordance with still further features of present invention, the locking device is formed by a projection on a part of the illumination arrangement or receiving part and a recess in the other part of the receiving part or the illumination arrangement, such that the projection is insertable into the recess; for locking.

On the other hand, the locking device can be formed by a projection on a part of the illumination arrangement or the receiving part and a hook on the other part of the receiving part or the illumination arrangement, wherein the hook is engageable behind the projection for locking.

These constructions provide for a simple design for the locking devices.

In accordance with still a further feature of the present invention, at least one locking device engages in the illumination arrangement in the turning-in direction and disengages from it in the turning-out direction. Therefore, the actuation of the locking device is possible during turning of the illumination arrangement around the turning axis without additional expenses.

In accordance with still a further feature of present invention, the illumination device has several portions which are offset relative to one another in direction of the turning axis and the receiving part has shell regions which are correspondingly offset relative to one another in direction of the turning axis, and correspondingly each of the portions is slidingly arranged in a corresponding one of the shell regions. Thereby a reliable guidance of this illumination arrangement during its turning around the turning axis is provided.

In accordance with still a further embodiment of the present invention, a spring element is arranged between at least one portion of the illumination arrangement and the receiving part with a pre-tensioning acting in direction of the turning axis. Thereby, a gap-free guidance of the illumination arrangement in direction of the turning axis is possible.

Finally, for the additional mounting of the vehicle, the illumination device is arranged on the receiving part in its turned-in position and forms with it a pre-mounted structural unit which is mounted on the vehicle, while during a subsequent dismounting and mounting of the illumination device in a service case, the receiving part remains mounted on the vehicle and the illumination device is released from the receiving part by turning in the turning-out direction or mounted on it by turning in the turning-in direction. This facilitates dismounting and mounting of the illumination arrangement for service cases.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
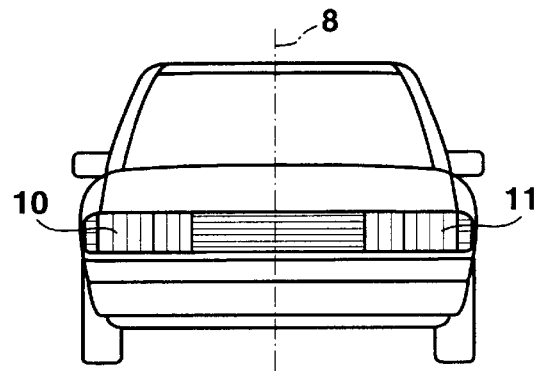
FIG. 1 is a view showing a cross-section of a vehicle with an illumination device.

A vehicle, in particular a motor vehicle, as shown in FIG. 1 on a front view is provided in a known manner with two illumination devices 10 and 11 on its front end. For example, they can be formed as a headlight or a headlight-light unit which has at least one headlight and a light, for example a front blinking light. The illumination arrangements 10, 11 are mounted on the vehicle releaseably on at least one receptacle. A mounting device for mounting the illumination arrangement 10 of the vehicle will be described hereinbelow.

The illumination arrangement 10 has a housing 12, in which one or several not shown reflectors with corresponding light sources are arranged. Its light outlet opening is covered with a light permeable disk 14. The housing 12 is releaseably mountable through several mounting points, for example on a front part 16 of the vehicle in a receptacle formed as a depression. A support 18 projects from the rear side of the housing 12 near a lateral edge region and near an upper edge region of the housing 12 as a part of a first mounting point. The housing 12 is mountable rigidly on the front part 16 of the vehicle for example by a screw 20 which extends through an opening of the support 18. The support 18 is arranged for example near the inner edge region of the housing 12 which faces the longitudinal central plane 8 of the vehicle.

At least one portion 22 is arranged near the other lateral edge, and in the shown embodiment near the outer edge of the housing 12 which faces away from the longitudinal central plane 8 of the housing, on its rear side. The portion 20 is formed so that it is convexed back in at least approximately horizontal planes of the housing 12 and is curved at least approximately arcuately. In the shown embodiment of FIG. 2, three portions 22a, 2b, 22c are arranged in a vertical direction and offset relative to one another, whereas they extend convexly from the housing 12 and curved at least approximately arcuately. The center point of the circular arcs of the portions 22a, 22b, 22c is located at least approximately on a common axis 52.

Figure 2:
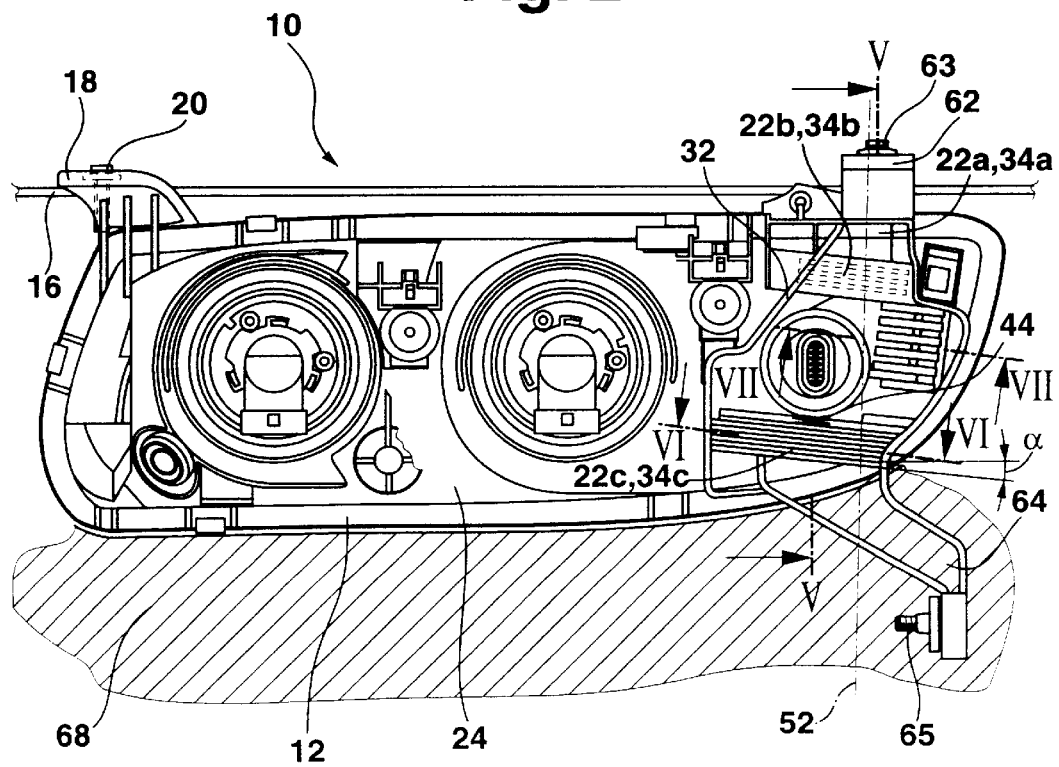
FIG. 2 is a view showing an illumination device from a rear in a turned-in position.
Figure 5:
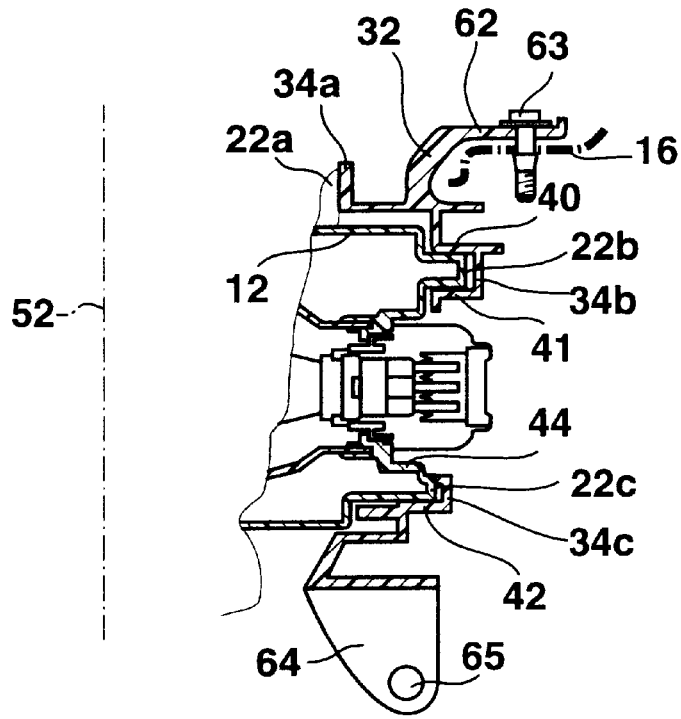
FIG. 5 is a view showing a cross-section of the illumination arrangement in a section taken along the line V—V in FIG. 2.

The portions 22a, 22b, 22c can be also arranged as shown in FIG. 2 so that they are offset relative to one another in a horizontal direction. Their centers of curvature are located at least approximately on the common axis 52. Furthermore, the portions 22a, 22b, 22c can project different distances from the rear wall 24 of said housing 12 in the horizontal planes as shown in FIG. 5. However, the center points of their circular-arc curvatures are located approximately on the common axis 52. The portions 22a, 22b, 22c are formed preferably of one-piece with the housing 12 which is composed of synthetic plastic, and produced by injection molding. It can be also provided that at least one of the portions 22a, 22b, 22c is formed by several small ribs which are spaced from one another in direction of the axis 52. They can be correspondingly convexly curved at their edges which face away from the housing 12.

Figure 6:
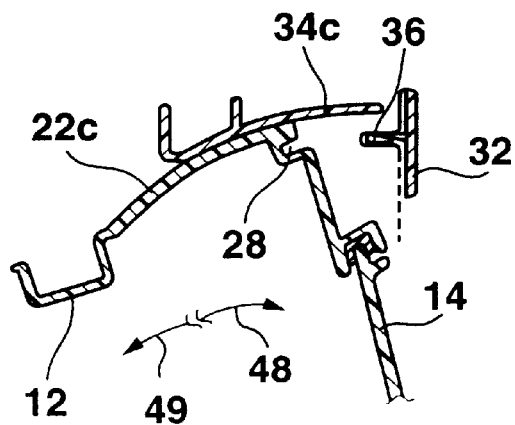
FIG. 6 is a view showing a section of the illumination device in a section taken along the line VI—VI in FIG. 2 with solid lines in a turned-out position and with broken lines in a turned-in position.
Figure 7:
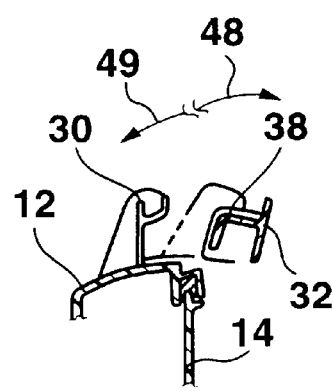
FIG. 7 is a view showing a cross-section of the illumination device in a section taken along the line VII—VII in FIG. 2 with solid lines in a turned-out position and with broken lines in a turned-in position.

At least one of the portions 22a, 22b, 22c, as shown for example for the portion 22c in FIG. 6, has a step 36 which faces the outer edge of the housing 12 and is arranged substantially perpendicular to its curvature. A recess 28 formed as a depression is formed in the step 26 and extends substantially tangential to the curvature of the portions 22a, 22b, 22c. As shown in FIG. 7, at least one L-shaped hook 30 projects from the rear wall 24 of the housing 12. Its free end region extends substantially tangential to the curvature of the portion 22 and faces the outer edge of the housing 12. The free end portion of the hook 30 can also extend concavely curved to the housing 12, and in particular substantial in accordance with a circular arc. Its center point is located at least approximately on the common axis 52. The hook 30 is offset in the vertical direction relative to the portions 22a, 22b, 22c, for example to be located between them. Also, a rib 31 can project from the upper wall of the housing 12 upwardly. On its front side which faces opposite to the insertion direction 50, the rib can be provided with a concavely curved running surface.

The receptacle on the vehicle has a part 32 which cooperates with the above described portions 22a, 22b, 22c of the vehicle 12 of the illumination arrangement 10. As shown in FIG. 5, a number of shell-shaped regions 34a, 34b, 34c corresponding to the number of the portions 22a, 22b, 22c is arranged on the receiving part 32. The portions extend at least approximately in the horizontal planes and concavely curved as shown in FIG. 6 for the shell region 34c. The curvatures of the shell regions 34a, 34b, 34c, are located at least approximately on a circular art. The central points of the curvatures of the shell regions 34a, 34b, 34c are located at least approximately on the common axis 52. A projection 36 is provided in addition on the receiving part 32 and faces toward the outer edge of the housing 12 as shown in FIG. 6. It is arranged near at least one shell region 34c and is offset forwardly on the latter substantially toward the housing 12 so as to face the shell region 34c.

Moreover, as shown in FIG. 7, a further projection 38 extends on the receiving portion 32 toward the housing 12. It is arranged so that it can cooperate with the hook 30 of the housing 12 in a manner which will be explained hereinbelow.

The projection 38 at its side facing away from the housing 12 extends substantially tangential to the axis 52 and is convexly curved with a circular-arc curvature, whose center point is located at least approximately on the common axis 52. In addition, the projection 39 can be arranged on the receiving part 32. It is formed so that it can cooperate with the rib 31 of the housing 12 and formed identically to the projection 38. The projection 39 can be convexly curved at its rear side facing away from the housing 12 in the insertion direction 50.

The shell region 34b of the receiving part 32, as shown in FIG. 5, is limited in a vertical direction from above by a wall 40 extending approximately perpendicular to the shell region 34b, and from below by a wall 41 which also extends approximately perpendicularly to it. The walls 40, 41 project from the curved shell forwardly toward the housing 12. The shell region 34c is limited from below also by a wall 42 which extends approximately perpendicular to it, and projects from the curved shell forwardly toward the housing 12. Above the shell region 34c, a springy element 44 formed for example as a flat spring is arranged on the receiving part 32. It is formed preferably of one piece with the receiving part 32 and moveably in a springy manner in a vertical direction.

During the mounting of the illumination arrangement 10 in the receptacle, first its housing 12 is moved in the direction of the arrow 50 in FIG. 5 opposite to the traveling direction of the vehicle from the front onto the receptacle. The illumination arrangement 10 is located in a turned-out position shown in FIG. 3. During insertion of the illumination arrangement 10 in the direction of the arrow 50, the portions 22a, 22b, 22c, of the housing 12 move their curved paths to an abutment against the curved tracks of the shell region 34a, 34b, 34c of the receiving part 32. In this position the support 18 of the housing 12 is arranged with a distance to its mounting point on the receptacle. The portions 22a, 22b, 22c are arranged slidingly displaceably in the shell regions 34a, 34b, 34c, and the central points of the curvatures of the portions 22a, 22b, 22c and the shell regions 34a, 34b, 34c are located at least approximately on the common axis 52.

During the sliding displacement of the portions 22a, 22b, 22c in the shell regions 34a, 34b, 34c the housing 12 performs a turning movement around the axis 52. The turning axis 52 extends at least approximately vertically and through the illumination arrangement 10. The portion 22b of the housing 12 is arranged with a little movability in direction of the turning axis 52 between the walls 40 and 41 which limit the shell region 34b from above and from below. The portion 22c of the housing 12 is located on the wall 42 which limits the shell region 34c from below, and the springy elements 44 engages with prestress in the upper surface of the portion 22c, so that it is held in abutment against the wall 42 and arranged in direction of the turning axis 52 without a gap between the wall 42 and the springy element 44. The portions 22a, 22b, 22c and the shell region 34a, 34b, 34c which are spaced from one another in direction of the turning axis 52 guarantee that the illumination arrangement 10 is not inclined or tilted relative to the turning axis 52, but is guided exactly turnably about the turning axis 52.

Figure 3:
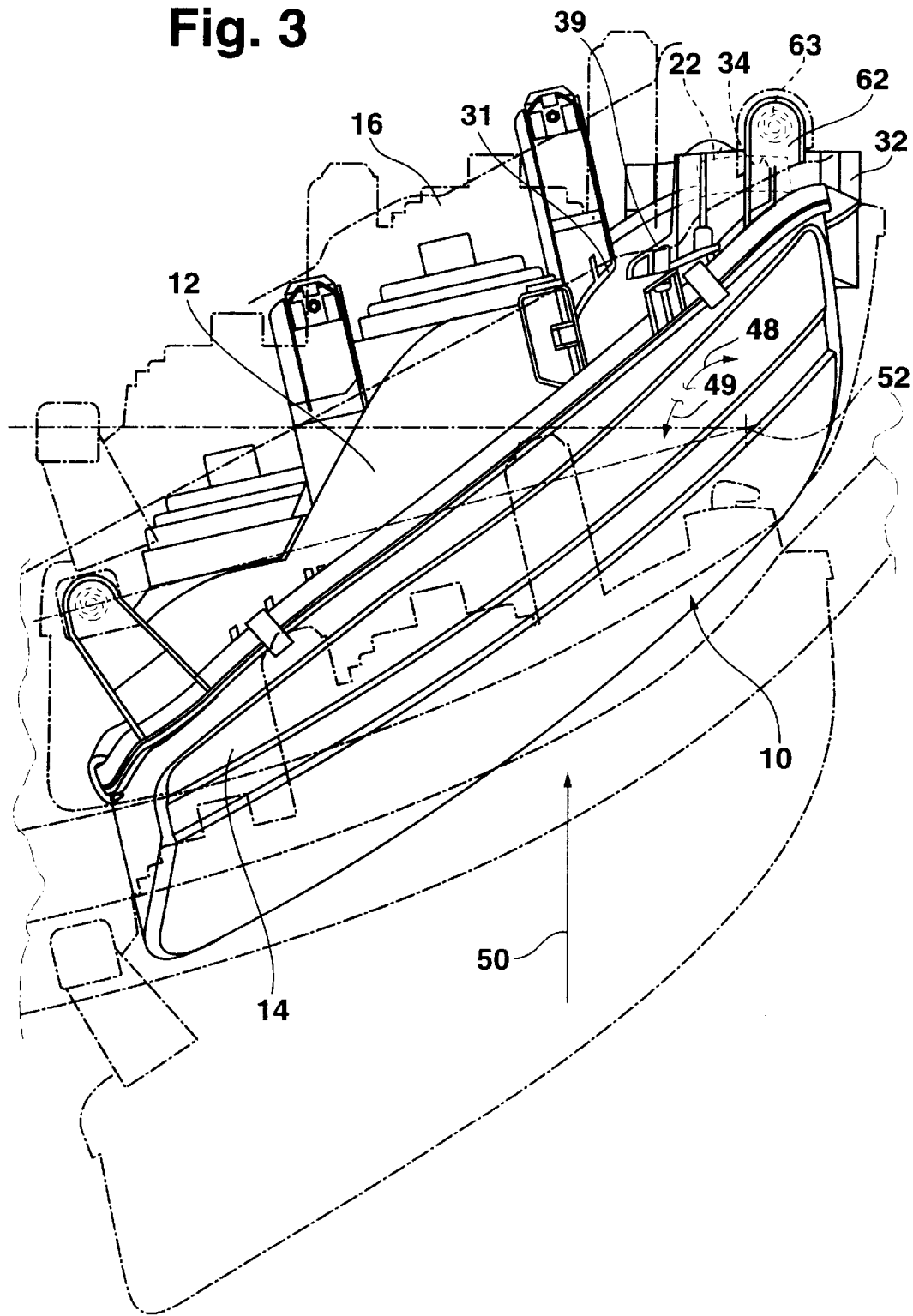
FIG. 3 is a view showing the illumination arrangement in a view from above in a turned-out position.
Figure 4:
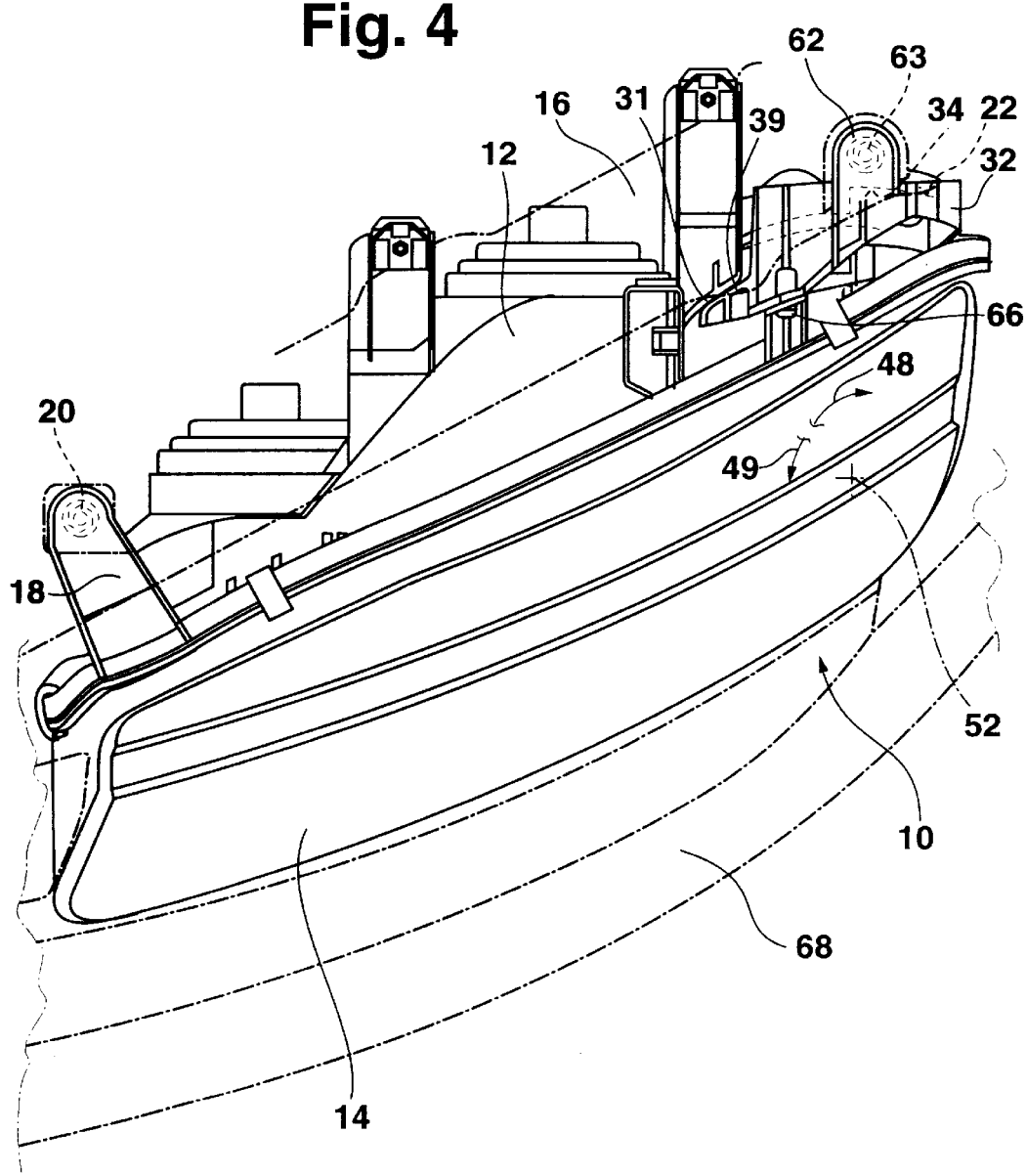
FIG. 4 is a view showing the illumination device from above in a turned-in position.

The illumination arrangement 10 is turned during its further mounting, starting from its turned-out position shown in FIG. 3 in the direction of the arrow 48 to the turned-in position shown in FIG. 4. In the turned-in position of the illumination arrangement 10, the support 18 is located in its predetermined mounting point on the receptacle on the vehicle part 16 and fixed by the screw 20. In the turned-in position of the illumination arrangement 10, the projection 36 of the receiving part 30 is inserted into the depression 28 of the portion 22c of the housing 12 in a tangential direction relative to the turning axis 52 as shown with broken lines in FIG. 6. Moreover, the hook 30 of the housing 12 engages behind the projection 38 of the receiving part 32 in the tangential direction relative to the turning axis 52 as shown in FIG. 7 with broken lines. The ribs 31 of the housing 12 engages moreover the projection 39 of the receiving part 32. With the projections 36 engaging in the depression 28 as well as the projection 38 engaging with the hook 30 with the projection 39 engaging with the rib 31, the illumination arrangement 10 is secured in its turned-in position from pulling out against the mounting direction 50. The cooperating parts including the projection 36 and the depression 28, the projection 38 and the hook 30, and the projection 39 and the rib 31 form a locking device.

For mounting of the illumination device 7, first its support 18 is released by removing the screw 20 from the receptacle. Then the illumination device 10 is turned away around the turning axis 52 with its edge region from tie receptacle in direction of the arrow 49 to its turned-out position. Therefore, the projection 36 exits the depression 28 and the hook 31, releases the projections 38, 39, so that the illumination arrangement 10 can be pulled out in direction opposite to the arrow 50 from the receptacle. The angle of turning the illumination arrangement 10 around the axis 52 between its turned-in position and turned-out position depends on the mounting conditions of the vehicle and can amount for example to substantially 10–20°. In the shown embodiment the illumination arrangement 10 is turnable over an angle of substantially 15°.

In a further modification of the above illustrated mounting device for the illumination arrangement 10, the portions 22a, 22b, 22c of the housing 12 as well as the shell regions 34a, 34b, 34c and the limiting walls 40, 41, 42 are inclined so that in the turning-out direction 49 of the illumination arrangement 10 they raise in direction toward the turning axis 52 at an angle α, as shown in FIG. 2. Thereby the illumination arrangement 10 during around the axis 52 during turning in (arrow direction 48) is moved in direction of the turning axis 52 downwardly, and during turning out (arrow direction 49 is moved in direction of the turning axis 52 upwardly. During mounting of the illumination arrangement 10 it is therefore not necessary to directly insert it into the narrowed receptacle, but instead it can be placed substantially higher than the receptacle, and during turning-in the illumination arrangement 10 can be lowered into the receptacle. During dismounting of the illumination arrangement 10, during turning-out it is substantially lifted from the narrowed receptacle and therefore can be simply handled.

In the shown embodiment the receiving part 32 is mounted as a separate component on a front part 16 of the vehicle. The receiving part 32 has a support 62 projecting upwardly and a support 64 projecting downwardly, which are releaseably mountable, for example by a screw 63 or 65 on the front part 16. It therefore can be provided that during the first mounting of the illumination arrangement 10 during the assembly of the vehicle by a vehicle manufacture, the receiving part 32 can be pre-mounted on the illumination arrangement 10. The receiving part 32 be fixed for example by a safety screw 66 in the turned-on position of the illumination arrangement 10 for preventing a release of the receiving part 32 from the illumination arrangement 10 before the mounting on the vehicle part 16. Alternatively, it can be provided that a fixing of the receiving part 32 on the illumination arrangement 10 is performed by a releaseable arresting connection.

The illumination arrangement 10 is mounted on the vehicle together with the receiving part 32 before it is mounted completely. After the mounting of the illumination arrangement 10 for example a shock absorber 68 or another front part is mounted on the vehicle and covers the supports 62 and 64 of the receiving part 32. The illumination arrangement 10 is mounted on the vehicle through the support 18 on the housing 12 by means of the screw 20 and through the receiving part 32 by means of the screws 63 and 65. With the completely mounted vehicle, the receiving parts 32 is no longer removable without first removing of the shock absorber 68. With the above described construction of the illumination arrangement, it is possible however that or dismounting of the illuminating arrangement 10 in the case of repair or service, only the screw 20 as well as the safety screw 66 must be removed, so that the illumination arrangement 10 can be turned out on receiving part 32 around the axis 52 and withdrawn opposite to the direction of the arrow 50 from the receptacle, while the receiving part 32 remains on the vehicle. The safety screw 66 is arranged so that it is accessible without dismounting of the vehicle parts. The subsequent new insertion of the illuminating arrangement 10 and its mounting is performed by insertion on the receiving part 32 and application of the screw 20 on the support 18.

Alternatively to the above described embodiment, the receiving part 32 can be arranged also fixedly on the front part 16 or another part of the vehicle, or formed of one piece with it. In this part, the mounting and the dismounting of the illumination arrangement 10 is performed as explained above by insertion of the portion 22 of the housing 12 into the shell region 34 of the receiving part 32, and turning-in around the axis 52 as well as placing the screw 20 or by removing of the screw 20 and turning-out around the axis 52. The safety screw 66 in this case is not needed and can be dispensed with.

In deviation from the above described embodiment of the mounting device with a vertically extending turning axis 52, it can extend in any direction, for example horizontally or inclinedly, in dependence from the mounting conditions of the illumination arrangement 10 on the vehicle. At least one portion 22a, 22b, 22c of the housing 12 of the illumination arrangement 10 and at least one shell region 34a, 34b, 34c of the receiving part 32 are formed correspondingly in the planes perpendicular to the turning axis to be convexly or concavely curved.

It will be understood that each of the elements described above, or two or more together, may also find a useful application in other types of constructions differing from the types described above.

While the invention has been illustrated and described as embodied in mounting device of an illumination arrangement of a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

We claim:

1. A mounting device for mounting an illumination arrangement on a vehicle at several mounting points whereby said illumination arrangement at one of said mounting points is pivotable about an axis between a turned-in position and a turned-out position, said mounting device comprising a receiving part arranged on said vehicle and having at least one concavely curved shell-shaped region extending in planes perpendicular to said pivoting axis; at least one portion provided on said illumination arrangement and convexly curved in planes extending perpendicular to said pivoting axis, said at least one portion in said turned-out position of said illumination arrangement being insertable in or withdrawable from said at least one shell region in a mounting direction and opposite to the mounting direction correspondingly, said at least one portion being arranged in said at least one shell region so as to be slidingly displaceable so that during a pivoting about said pivoting axis a sliding displacement of said portion over said region is performed.

2. A mounting device as defined in claim 1; and further comprising at least one locking device adapted to secure said illumination arrangement in said turned-in position against withdrawal in a direction opposite to said mounting direction.

3. A mounting device as defined in claim 2, wherein said at least one locking device includes a projection mounted on at least one of the illumination arrangement and the receiving part, and a recess formed in at least another of the illumination arrangement and the receiving part so that said projection is insertable in said recess for locking.

4. A mounting device as defined in claim 2, wherein said at least one locking device includes a projection formed on one of said illumination arrangement in said receiving part and a hook provided on another of said illumination arrangement and said receiving part so that said hook engages behind said projection for locking.

5. A mounting device as defined in claim 2, wherein said at least one locking device engages in said turning-in direction of said illumination arrangement and disengages in a turning-out direction.

6. A mounting device as defined in claim 1; and further comprising at least a further such portion arranged so that said portions are offset relative to one another in direction of said pivoting axis; and at least one further such shell region arranged so that said shell regions are offset relative to one another in direction of said pivoting axis, and a respective one of said portions being slidingly displaceable in a respective one of said shell regions.

7. A mounting device as defined in claim 1, wherein said at least one portion is non-displaceably guided on said at least one shell region in direction of said pivoting axis.

8. A mounting device as defined in claim 7, wherein said at least one portion and said at least one shell region raise in a turning-out direction of the illumination arrangement in direction toward said pivoting axis.

9. A mounting device as defined in claim 7, wherein said at least one portion and said at least one shell region fall in a turning-out direction of the illumination arrangement in direction toward said pivoting axis.

10. A mounting device as defined in claim 7, wherein said at least one shell region is limited at both sides in direction of said pivoting axis by two walls, said at least one portion being arranged between said walls.

11. A mounting device as defined in claim 1; and further comprising at least one springy element which is arranged between said at least one portion of the illumination arrangement and the receiving part with a pre-stress acting in direction of said pivoting axis.

12. A mounting device as defined in claim 1, wherein said receiving part is formed as a separate component mounted on the vehicle.

13. A mounting device as defined in claim 1, wherein said receiving part is formed so that during a first mounting of the vehicle the illumination arrangement is arranged on said receiving part in a turned-in position and forms a pre-mounted unit with said receiving part, and said premounted unit is mounted on the vehicle, and during a subsequent dismounting or mounting of the illumination arrangement in the case of servicing said receiving part remains mounted on the vehicle while the illumination arrangement is released from said receiving part by turning in a turning-out direction and mounted on the mounting part by turning in the turning-in direction.

14. A mounting device as defined in claim 1, wherein said receiving part is formed as a part which is of one-piece with a part of the vehicle.

15. A mounting device as defined in claim 1, wherein said portion in said region are formed so that during sliding displacement, said portion and said region slide over one another with a sliding contact therebetween.

16. A mounting device as defined in claim 1, wherein said portion and said region have a substantially similar curvature with a center of curvature in said pivoting axis.

* * * * *